March 24, 1936.   F. BENEDICT   2,035,420
BATTERY CHARGING SYSTEM
Filed March 3, 1932
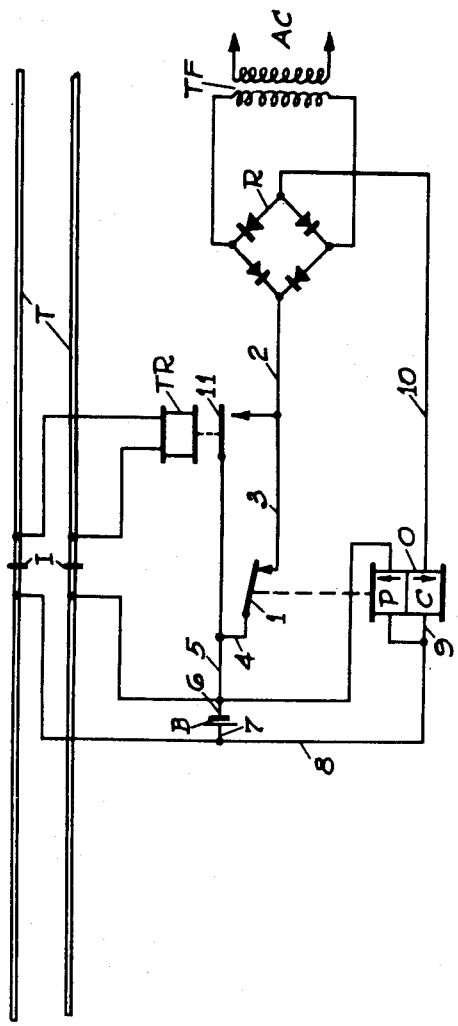
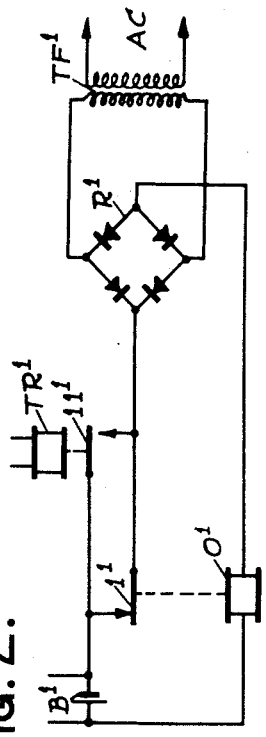
INVENTOR
Frank Benedict,
BY Neil D. Ralston,
his ATTORNEY Patented Mar. 24, 1936

2,035,420

UNITED STATES PATENT OFFICE 2,035,420

BATTERY CHARGING SYSTEM

Frank Benedict, Rutherford, N. J., assignor to General Railway Signal Company, Rochester, N. Y.

Application March 3, 1932, Serial No. 596,553

11 Claims. (Cl. 246—41)

This invention relates to battery charging systems, and more particularly to a system for controlling the charging of batteries according to the existing charged condition thereof.

When certain types of batteries such as storage batteries used for railway signalling purposes are trickle charged it has been found that it is very difficult to regulate the charging rate in such a manner that the battery is constantly maintained in a fully charged condition. The difficulty experienced in maintaining such a charging rate is due to the load on the battery being variable and often after a constant charging rate is established the battery may at times be greatly overcharged and at other times it may be undercharged.

It has been found impractical to either control the charging of a battery or to regulate its charging rate by taking advantage of variations in terminal voltage of such battery, because such variations are slight between a maximum charged condition and a practically discharged condition. However there is a much more pronounced change in the charging current of such battery from the maximum charging current at a discharged condition of the battery to a minimum current at a fully charged condition thereof.

It is therefore proposed in accordance with this invention to provide a means which will interrupt the charging circuit of a battery when the current in its charging circuit falls below a predetermined value. It is obvious that when the charging circuit is thus interrupted, an external means must be provided for again starting the charging operation of the battery, and it is also proposed in accordance with this invention to provide in the automatic battery charging control system an automatic means for periodically restoring the charging circuit.

Other objects, purposes and characteristic features of the invention will appear as the description thereof progresses during which reference will be made to the accompanying drawing which shows the invention in a manner to make it easily understood rather than with the view of showing the particular arrangement preferably employed in practice, and in which:—

Fig. 1 diagrammatically shows a system for controlling the charging of a battery associated with a railway track circuit as one application of the present invention, and Fig. 2 is a modified arrangement of the present invention applied in a manner similar to Fig. 1.

Referring to Fig. 1 of the accompanying drawing a portion of railway track T is shown divided into two track sections by the insulated joints I. Across the rails at one end of these sections is connected a track battery B of the conventional storage type. Across the rails at the other end of these sections is connected a track relay TR, which may be the same relay as used in the conventional block signalling systems. A source of battery charging energy is indicated by the conventional arrangement of a full wave rectifier R connected to a transformer TF which is in turn connected to an alternating current source of energy AC.

The control of the battery charging is effected in Fig. 1 by a differential relay O, which is indicated as comprising two coils P and C. The coil P may be termed the battery potential coil, which it can be seen is connected directly across the terminals of the battery B and consequently the windings of this coil P will be of comparatively high resistance. The coil C is a series charging current coil and is arranged so that during a normal charging rate, or a rate at which the battery is charged when not in a fully charged condition, the tractive force of these coils is approximately equal, but, as shown, the magnetic effects of these coils P and C are opposed to each other, and consequently in this condition substantially no resultant tractive force will act on the armature of this relay.

The circuit for charging the battery B may be traced from the positive output terminal of the rectifier R, wires 2 and 3, back contact 1 of the differential control relay O, wires 4, 5 and 6, through the battery B, wires 7, 8 and 9, through the current coil C of the control relay O, and back to the negative side of the rectifier R by wire 10. In as much as the battery voltage may be considered to be approximate constant variations in the tractive force of the armature of this relay will be principally effected by the variation in the charging current due to the change in the charged condition of the battery B. When the battery B becomes fully charged it is obvious that a smaller current will flow through the series winding C, and consequently its effect will not equalize the tractive force produced by the potential winding P, which latter winding will then pick up the armature of the relay and open the charging circuit at back contact 1.

It is now obvious that this charging circuit will remain open indefinitely unless it can be again established by an external shunt around open back contact 1 of relay O. A method of supplying the shunt may be obtained in several manners such as a back contact 11 of a track relay, as shown, a contact of a signal mechanism, a mid-stroke contact of a switch machine mechanism, or any contact which is periodically made. If a track relay be used, as shown, it is normally energized as by a source such as B, connected across the rails at the opposite end of its block, whereby occupancy of the block causes the car wheels and axles to shunt the relay and cause it to release its contact finger.

The operation of this shunt is to again set up a charging circuit which, owing through the series coil C, may or may not be of sufficient value to equalize the effect of the potential winding P depending upon the charged condition of the battery B. However if sufficient energy has been taken from the battery B, between the time of interruption of the charging circuit by the differential relay and the establishing of this circuit by the dropping of the track relay TR, the current in the newly established charging circuit will be of a value which will sufficiently nearly equalize the effect of the potential winding P to cause the armature of the relay to remain down, and contact 1 will thereafter remain closed until the battery has been again sufficiently charged to reduce the charging current to a value effecting the picking up of the relay armature.

The modified arrangement shown in Fig. 2 of the accompanying drawing with like parts shown with distinctive exponents is the same in its operation except that a single coil relay $O^1$ is substituted for the differential relay O in Fig. 1, and the battery charging circuit is controlled by a front contact $1^1$ of this relay $O^1$ instead of the back contact 1 of relay O in Fig. 1. The relay $O^1$ has its operating winding in series with the charging circuit for the battery $B^1$ and is so arranged that the charging current in this circuit when the battery is not fully charged is sufficient to hold up the armature and maintain the circuit at front contact $1^1$. However when the battery becomes fully charged this charging current decreases to a value which will no longer effect the holding up of the armature of the relay $O^1$ thus opening the charging circuit at front contact $1^1$.

The same back contact $11^1$ of the track relay $TR^1$ is shown as a means for restoring the charging circuit and of course may be substituted by any of the means outlined in connection with the arrangement shown in Fig. 1. The operation of this restoring means is obvious, or that is, after establishing the charging circuit, the picking up of the track relay $TR^1$ allows the charging of the battery to be controlled by the relay $O^1$.

A battery charging circuit has thus been provided which automatically cuts off the charging current when the battery has been fully charged, as determined by the arrangement of windings on a differential relay or by a marginal series relay and a means for periodically re-establishing the charging circuit thus interrupted, which functions only to initiate the battery charging and such charging will continue only in the event that the battery is not in a fully charged condition.

In describing the present invention attention has been directed to the specific embodiments thereof which were shown, without attempting to point out the various alternate or optional features of construction, or the different organizations and combinations that may be employed. For example the track relay shown as a means for re-establishing the charging circuit may be supplanted by any piece of apparatus that will start the charging periodically and preferably in proportion to the rate of discharge.

In other words the particular embodiments of the present invention have been selected to facilitate disclosure thereof, rather than to limit it to the particular forms illustrated.

Having thus shown and described my invention, what I claim is:—

1. In a battery charging system, a storage battery, a source of charging current for said battery, a relay having one winding energized by the potential of said battery and a second winding oppositely connected relative thereto and in series with a circuit including a contact of said relay and charging said battery from said source of current whereby said relay picks up its armature when the current charging said battery falls below a predetermined value.

2. In a battery charging system, a storage battery, a source of charging current for said battery and a relay having one winding energized by the potential of said battery and a second winding oppositely connected relative thereto and in series with a circuit for charging said battery including a back contact of said relay whereby said charging current is interrupted by the picking up of said relay when the current charging said battery falls below a predetermined value.

3. In a battery charging system, a storage battery, a source of charging current for said battery, a relay having one winding energized by the potential of said battery and a second winding oppositely connected relative thereto and in series with a circuit for charging said battery including a back contact of said relay whereby charging current is interrupted by the picking up of said relay when the current charging said battery falls below a predetermined value, and means arranged to intermittently establish said circuit for charging said battery.

4. A battery charging system comprising a storage battery, a source of charging current, a differential relay having a potential winding and a series charging current winding, contact means operated by said relay arranged to prevent the charging of said battery when the effect of the potential winding of said relay is greater than the effect of said series charging current winding and an initiating means arranged to intermittently start the charging of said battery.

5. In a railway track circuit, an insulated track section, a battery supplying current to the rails of said track section, a source of energy for charging said battery, a differential relay, a circuit for charging said battery including a series winding and a back contact of said differential relay, a potential winding on said differential relay connected to said battery so as to oppose said series winding whereby said differential relay is picked up when the current in said charging circuit falls below a predetermined value and means arranged to start the charging of said battery in accordance with railway traffic.

6. In a railway signalling system, a storage battery, means for supplying charging current for said battery, a differential relay having a battery potential winding and a series charging current winding, contact means operated by said relay arranged to prevent charging said battery when the effect of the battery potential winding is greater than the effect of said series winding and means restoring said charging circuit by a change in condition of a traffic controlled device.

7. A battery charging system including a battery, a charging source of energy, a differential relay having a battery potential winding connected across the battery and a series charging winding connected in a charging circuit and means controlled by the relay for preventing charging when the effect of the potential winding is greater than the effect of the series winding.

8. In a battery charging system, a storage battery, means for supplying current capable of charging said battery, a relay having its operating windings and a front contact thereof in series with a circuit for charging said battery whereby charging of said battery is interrupted when the charging current falls below a predetermined value, and means for establishing said charging circuit in a manner to energize said relay.

9. In a system for charging a railway track circuit battery, a storage track battery, a source of energy capable of charging said battery, a relay having a winding connected in series with a circuit for charging said battery, contact means operated by said relay and arranged to interrupt said charging circuit when the current in said relay winding falls below a predetermined value, and a track relay having a back contact operable to re-establish said charging circuit.

10. In combination, a first source of energy, a two-element relay arranged to attract its armature when energized with the normal potential of said first source of energy but to release its armature when the potential of said first source of energy falls below a predetermined value, a second source of energy, and means connecting said second source of energy in multiple with said first source of energy through one element of said two-element relay when the armature of said two-element relay is released whereby the effect of one element of said two-element relay opposes the effect of the other element.

11. In a supply system, in combination, a load, a normal source of energy for normally supplying the load, an auxiliary source of energy normally disconnected from the load, a relay having differential windings and normally energized by the normal source to attracted position, a circuit connecting the auxiliary source to the load and including a back point of the relay and one of the windings of the relay to offset the effect of the normal source on the relay.

FRANK BENEDICT.